May 3, 1966   L. H. WHEELER   3,248,999
COMPACT WIDE ANGLE PROJECTION SYSTEM FOR PROJECTING A
MULTIPLICITY OF SEPARATE IMAGES
Filed April 10, 1961   3 Sheets-Sheet 1

INVENTOR.
LIONEL H. WHEELER
BY
Miketta and Glenny
ATTORNEYS.

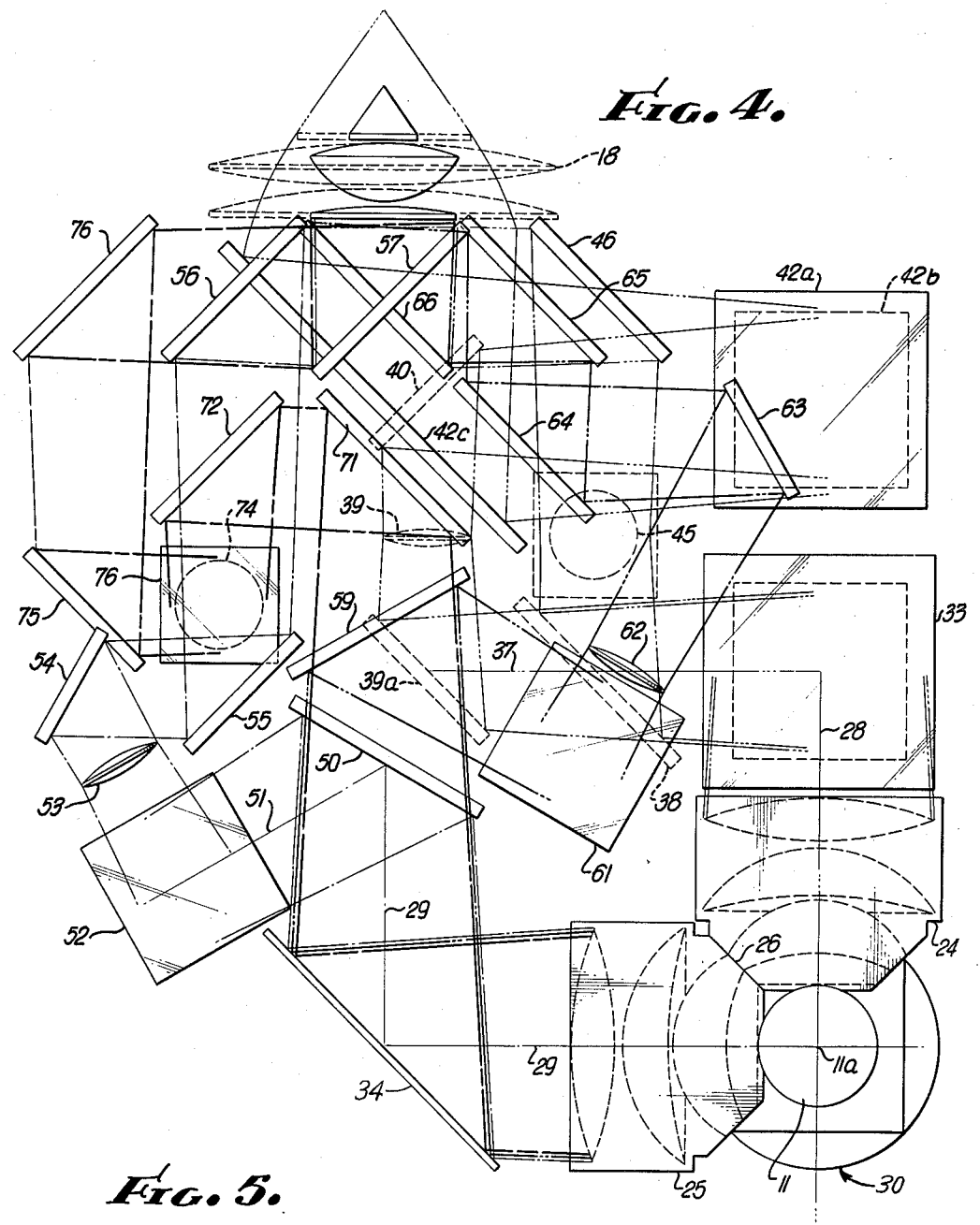

United States Patent Office 3,248,999
Patented May 3, 1966

3,248,999
COMPACT WIDE ANGLE PROJECTION SYSTEM FOR PROJECTING A MULTIPLICITY OF SEPARATE IMAGES
Lionel H. Wheeler, Glendale, Calif., assignor to Colorvision, Inc., Los Angeles, Calif., a corporation of California
Filed Apr. 10, 1961, Ser. No. 102,038
10 Claims. (Cl. 88—24)

This invention relates to a geometrically compact wide angle projection system and means for simultaneous multiple projection of a plurality of images upon a screen relatively closely spaced to the film plane of the system and utilizing a single light source.

The advantages of the present invention may be best understood by reference to an exemplary situation to which the present projection system is applicable and it is understood that the present invention may be adapted and employed in various other situations and/or other purposes. The exemplary situation concerns the study and observation of a map projected upon a screen under severe limited space requirements such as in a vehicle, mobile trailer or van, or a relatively small room. It is desirable that the screen be large enough for convenient observation by the group of persons and that the screen and projection means occupy a minimum of space. In the projection of a map situation on the screen the presentation of a certain situation thereon may require location of various elements, symbols, data and other intelligence and information all of which may not be part of the permanent map record. Various elements may change location at different times and the relationship of space, distance, direction and time may become of primary importance to the observing group so that proper study and understanding of a changing situation may be accomplished.

In view of the information to be presented and the demands of limited space prior proposed types of multiple projection systems have not been readily adaptable to the exemplary situation mentioned above because they are too large, bulky, awkward to handle, and usually include a plurality of projectors each having its own light source and associated projection means. A plurality of projectors arranged in side by side relation or otherwise so as to project on a single screen the various elements and information required presented numerous disadvantages and problems including extensive corrective means for the parallax of the projectors, and difficulties of simultaneous operation of two or more projectors. Coordination of, for example, five separate projectors under such confined space becomes practically extremely difficult.

Where wide angle projection of a plurality of images in superposed relation was desired and a plurality of film frames were spaced in close relation, instead of using a plurality of projectors, difficulties were encountered in the vignetting of the illumination for each frame. As a result of this vignetting, prior proposed optical systems required relatively wide spacing apart of adjacent film frames and thus accentuated problems of parallax.

The present invention contemplates a projection system and means which obviates the disadvantages of utilizing a plurality of separate projectors and provides a projection system which is capable of projecting simultaneously from one projection station a multiplicity (in this example five) of separate images which may be of different size, shape and color, each image constituting intelligence or information associated and related to the other images and upon a single relatively large (approximately 7 ft. by 9 ft.) screen. The film plane of the projection means is located at a station approximately 7 ft. from the screen.

Generally speaking, an example of the present invention may comprise a projection system employing a single light source which emits wave-length bands of light in the visible spectrum, two condenser lenses and related reflector means associated with the light source in such a manner that substantially all of the light emitted from the source is directed along two separate main light beams, one of said light beams being divided into two light beam portions, one light beam portion being used to furnish light for projection of a map upon the screen. The other main light beam is divided by means of dichroic light transmitting and reflecting means into a plurality of separate light paths including wave-lengths of light in the red, green and blue region of the visible spectrum. The separate red, green and blue light paths and the two light beam portions are directed by reflector means through relay lenses and aperture lenses to projection lenses in which the relay lenses image the condenser lenses in reduced or magnified relation, the aperture lenses imaging the light source at the nodal point of the projection lenses. A film plane is provided at the aperture lenses which may be conveniently arranged in a row in such a manner that the film centers are spaced together as closely as possible. As a result of this arrangement parallax between the five projection lenses is reduced to a minimum and because of the arrangement of the relay lenses with the magnified image of the light source, illumination of the screen is substantially uniform over its entire screen area. The above arrangement of the projection system and the lenses therein permits the projection lenses to be of extremely wide angle and in the example may approximate a projection throw angle of approximately 90°. The present projection system is also provided with means for transmitting wave-length bands in the infra-red region out of the projection system so that heat from the light source is reduced and cooling problems at the film plane are reduced. The above projection system provides for the projection of a map upon the entire area of the screen and also provides for the projection of selected intelligence elements upon the screen in the form of overlays or superposed areas of red, green, blue and white light.

It is therefore the primary object of this invention to disclose and provide a novel wide-angle projection system for simultaneous projection of a multiplicity of different images from a single light source and from a single projection station.

An object of this invention is to provide a novel projection system wherein the projection angle may be approximately 90° and wherein a screen illuminated by light from the projection system is substantially uniformly illuminated.

Another object of this invention is to disclose and provide a geometrically compact projection means and screen wherein a multiplicity of separately projected images may be simultaneously projected upon the screen in different color and in selected brilliance to provide desired contrast and readability.

A further object of this invention is to disclose and provide a projection system employing a single light source and wherein heat from said light source is ejected from the system for reducing the amount of heat at a film plane.

A still further object of the invention is to disclose and provide a projection system employing a single light source and projecting a multiplicity of images simultaneously wherein a plurality of film frames are spaced closely together in a common plane.

A further object of the invention is to disclose and provide a projecting system for projecting a multiplicity of images at a wide projection angle and wherein parallax is reduced to a minimum.

An important object of the invention is to provide a projection system adapted to project multiple images at a wide angle by employment of a relay lens system in the light path for each image.

Another important object of the invention is to provide a projection system for multiple images wherein a single light source is utilized and wherein the light emanating from said light source is used with maximum efficiency and to provide energy in different forms for certain of the projected images.

Another object of the invention is to provide an illumination optical system adapted for use in a multiple image projection system wherein light from a light source is accepted through virtually 360° in azimuth around the source and through approximately 90° in the polar dimension of the source.

A further object of the invention is to provide a single light source and to surround the light source with an illumination optical system which may include at least two or more condenser systems with or without reflector means.

The invention further contemplates a projection system utilizing a single light source, a projection lens, and an optical system for directing light from the source along two or more light paths and projecting light transmitter by each path upon a screen in adjacent relation.

In addition to the above objects, many other objects and advantages of the present invention will be readily apparent to those skilled in the art from the following description of the drawings which illustrate an exemplary embodiment of the invention.

In the drawings:

FIG. 4 is a top view of the projector optical system with the reflectors included.

FIG. 5 is a schematic simplified view of a relay illumination optical system embodying the invention and used in the projector shown in FIG. 1.

Figure 2:
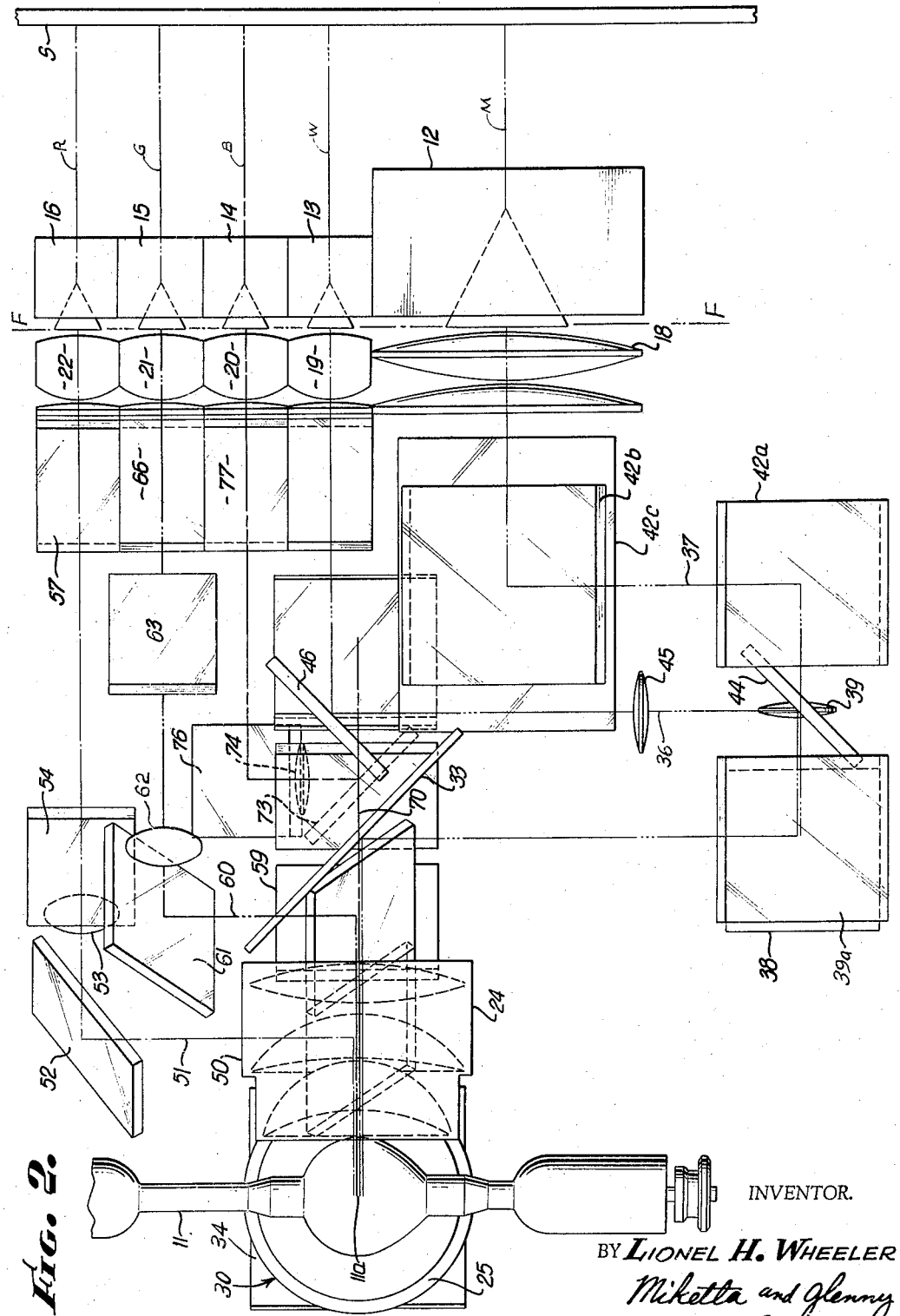
FIG. 2 is a side view of the projector optical system embodied in the projector shown in FIG. 1 and with reflectors omitted for simplicity.

In general, a projection system embodying this invention includes a projection means 10 at a projection station P for simultaneously projecting upon a single screen S a multiplicity of images such as the images M, W, B, G and R, said images identifying a map image in color and overlay images in white, blue, green and red colors. The projection means 10 includes a single light source 11, a plurality of projection lenses 12, 13, 14, 15 and 16 for projecting the corresponding images M, W, B, G and R respectively. The projection lenses are arranged in close spaced relation and in a row and a film plane F is defined by the projection means and lies in a plane common to and at a plurality of field or aperture lenses 18, 19, 20 21 and 22 (FIG. 2) associated respectively with the corresponding projection lenses. Between the plurality of aperture lenses and the light source 11, means are provided for both dividing and separating light emanating from the light source into a plurality of main light beams, one main beam being separated into light beam portions containing all wave-length bands of light for projection of the color image M and white image W and the other main beam being divided into color separation light paths containing wave-length bands of light providing blue, green and red light for projection of images B, G and R upon the screen.

Figure 3:
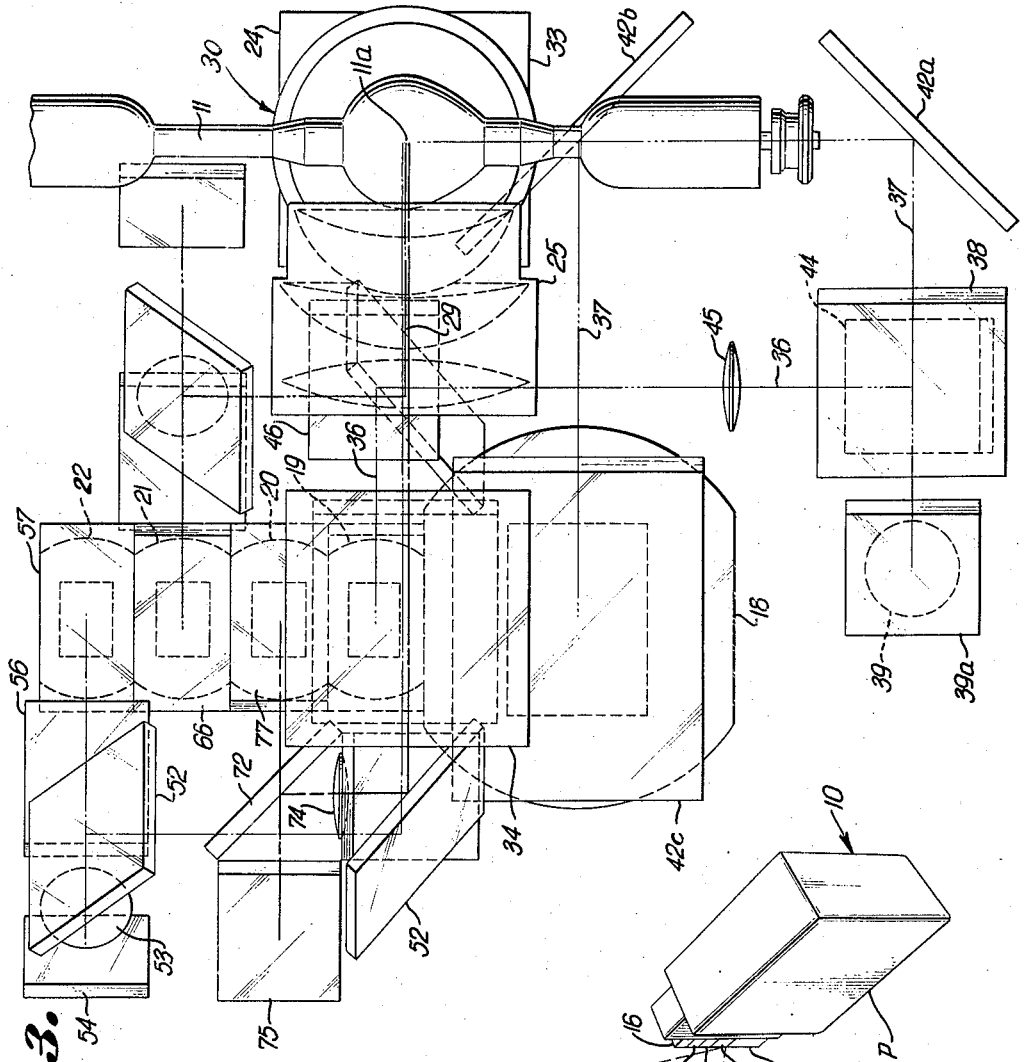
FIG. 3 is an end view of the projector optical system shown in FIG. 2.
Figure 1:
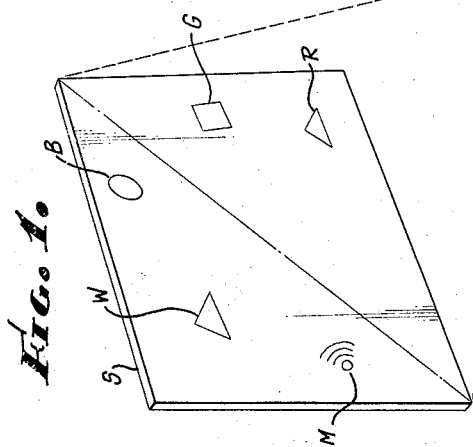
FIG. 1 is a perspective view of a projector embodying this invention in association with a screen.

It is important to note in FIG. 1 that the projector station at P is closely spaced to the screen S and illustrates the extremely short projection distance or throw from the projection lenses to the screen. The wide angle projection system in FIG. 1 is so arranged that the projection angle with respect to the longest dimension of the screen, that is, the diagonal of the screen, subtends an angle of approximately 90°.

The screen S may be of any well known type of screen material and may include screens which are suitable for either front or back projection. For the present exemplary purposes of map and overlay projection in a limited space back projection may be preferred. In back projection, the screen S must transmit light therethrough with substantial uniformity throughout its area, and it must be protected from ambient light to provide maximum contrast. The screen S may be supported in suitable manner and may be of selected rectangular shape.

The single light source means 11 of the projection system may be a concentrated light source provided by a well known type of high pressure lamp. Preferably the light emanating or radiating from the lamp 11a should include light in the visible spectrum and have the characteristics of daylight. Such a known lamp is an Osram high pressure xenon lamp.

Associated with the light source 11 is a condenser means including two condenser lenses 24 and 25 arranged with their optical axes at 90°, the axes intersecting at the lamp 11a of light source. The condenser lenses 24 and 25 are spaced closely to the light source and may abut each other along complementary surfaces at 26 and generally occupy one side or 180° of the circumferential zone surrounding the light source 11. The condenser lenses 24 and 25 serve to define and provide two main light beams 28 and 29, each beam including wave-length bands of light of the visible spectrum, infra-red and ultra violet wave lengths.

Reflector means 30 are associated with the light source at the side thereof opposite to the condenser lenses. The reflector means 30 may be of spherical type and subtend an angle of 180°. Light emanating from the concentrated light source 11 in a direction away from the condenser lenses 24 and 25 is reflected by said reflector means 30 toward the condenser lenses 24 and 25 and forms part of the light that is transmitted through the condenser lenses 24 and 25. As a result of this arrangement, the light emanating from the light source 11 is efficiently used and light losses at the source are reduced to a minimum.

The condenser means 24 and 25 may be of suitable make and each serves to receive and transmit approximately one-half of all of the light emanating from light source 11 along the two main light beams 28 and 29 which initially lie along the optical axes of the condenser lenses. In normal practice, the diameter of the condenser means is relatively large or wide to provide a projection-throw angle of approximately 90°. However a wide condenser means would require substantial spacing apart of the projection lenses and thus increase parallax. In the optical systems which are described hereafter, relay lenses are employed in such a manner that parallax is reduced to a minimum and condenser lenses may be selected of relatively small width.

Before describing the compact geometrically arranged multiple light path system for simultaneous projection of a plurality of images, the principal components of the optical system for each light path is referred to as shown in FIG. 5. Each light path optical system is a relay system and includes a condenser lens C which forms an aerial image of the light source L at a relay lens R. Field or aperture lens A has a focal plane at the relay lens and the aerial image of the light source is imaged by lens A at the nodal point of the projection lens P. The relay lens R serves to image the condenser system C at the film plane F. It should be noted that the position of the relay lens R in the total light path determines the area of the film to be illuminated at the film plane F, the acceptance angle of the condenser system relative to the light source remaining constant. It will be understood that each of the light paths provided for the map image and white, red, green, and blue overlay images may include the above components; other parts of the optical system as well as the above components now being described in further detail.

Light source 11 produces a substantial quantity of heat and it is desirable to remove heat as soon as possible before the heat can reach the other elements in the projection system and particularly the film plane. For this purpose heat removal means in the form of dichroic transmitting and reflecting means 33 and 34 are provided in the respective light beams 28 and 29. Each of the transmitting and reflecting means 33 and 34 serves to transmit out of the projection system substantially all the infra-red wave-length bands, such infra-red wave-length bands containing a substantial amount of the heat emanating from the light source. Wave-length bands of light containing the visible spectrum and substantially all of the remaining light are reflected by the infra-red dichroic means 33 and 34. Dichroic mirrors of known make and manufacture for such selective separation of infra-red wave-length bands may be employed for the light transmitting and reflecting means 33 and 34.

The main light beam 28 serves to provide all of the light for projection of the map image M and the white overlay image W. For this purpose the main light beam 28 is sepaarted into two light beam portions 36 and 37.

As best seen in FIG. 4, the main light beam 28 is reflected to a partial mirror 38 after a major portion of the infra-red wave-length bands of light have been separated from the other wave-length bands of light by the dichroic light transmitting and reflecting means 33. The partial mirror 38 divides the main light beam 28 into two light beam portions 36 and 37 and such division of all of the light in light beam 28 may be in any selected proportion, such as 30:70, to provide suitable brightness of the map image and of the white image W.

The light beam portion 37 is directed to a map relay lens 39, then to a reflector or mirror 40 from which the light beam portion 37 is reflected by mirrors 42a, 42b and 42c to the map aperture lens 18 and thence is transmitted to the map projection lens 12.

The light beam portion 36 is reflected by a mirror 44 to a white light relay lens 45 and thence to a reflector 46 which directs the overlay white light beam portion 36 to the aperture lenses 19 and to the projection lens 13.

The second main light beam 29 is separated into three paths of red, green and blue light. As best seen in FIG. 4 the main light beam 29, after it passes through condenser lens 25 and the dichroic infra-red transmitting mirror 34, is directed to a dichroic light transmitting and reflecting means or mirror 50 which serves to reflect only selected wave-length bands of light containing red light while transmitting the remaining light. Such red light is directed along a red light path 51 to a mirror 52 and thence to a red light relay lens 53. Light from relay lens 53 is reflected by a mirror 54 to a mirror 55 and thence to a mirror 56 adjacent the aperture lenses. Light reflected from the mirror 56 is reflected by a mirror 57 into the associated aperture lens 22.

The remaining light transmitted by the dichroic means 50 is directed to a second dichroic means 59 which reflects wave-length bands containing green light and transmits wave-length bands of light containing blue light. The reflected green light is directed along a path 60 to a reflector mirror 61 which directs this green light through a relay lens 62 and to another mirror 63 which directs the green light to a mirror 64 and thence to a mirror 65 adjacent the aperture lens and thence to a final mirror 66 which directs the green light to its associated aperture lens 21.

The blue light transmitted by the dichroic mirror 59 is directed along a blue light path 70 to a mirror 71 which reflects blue light to a dichroic mirror 72 which may again transmit infra-red wave-length bands of light which may be remaining in said blue light out of the blue light path. The blue light path is directed from dichroic mirror 72 to a mirror 73 and then upwardly through a relay lens 74 to a mirror 75 which directs the blue light path to a mirror 76 adjacent the aperture lens and which then directs the blue light path to the final mirror 77 which is located behind its associated aperture lens.

It will be readily understood that the white, red, green, and blue light paths may be reflected by suitable well known front surface reflecting mirrors in any suitable direction to provide a geometric arrangement having an extremely compact optical system in which a plurality of separate light paths and separate light beam portions are provided. The employment of dichroic mirrors in the separation of the main light beam 29 into red, blue and green light affords an efficient separation of such light wherein virtually all of the wave-length bands of light selected are transmitted with a minimum of loss of efficiency. The dichroic light transmitting and reflecting means permit such efficient transmission of light because little of the light which is passed therethrough is absorbed and as a result a highly efficient light transmission and reflecting system is provided by the use of the dichroic mirrors with the main light beam 29.

The white overlay beam portion 36 and the red, green, and blue light paths 51, 60 and 70 are of equal length and the respective relay lenses 45, 53, 62, 74 provided in said beam portion and light paths are located with their focal length the same distance from the light source 11. The condenser means 24 and 25 focus an aerial image of the light source 11 at the respective relay lenses 45, 53, 52 and 74, said relay lenses serving also to image the condenser means at the film plane F. The aperture lenses for the respective light beam portion 36 and light paths 51, 60 and 70 serve to reimage the aerial image of the light source at the nodal point respective projection lenses. The focal length of the aperture lenses is selected to provide a wide angle of illumination which is compatible with the angle of projection of the projection lenses. Thus vignetting is avoided and the conditions of parallax are reduced to a minimum.

In the exemplary arrangement of the aperture lenses 18–22 inclusive the exit pupils of said aperture lenses lie in a row and in a common plane. The film plane F is virtually at said common plane of the aperture lenses. Means are provided for supporting a film strip, such as 35 mm. (not shown) at the film plane and may be of any well known construction and may permit the sliding of the film strip into position in front of a selected aperture lens. Preferably a film strip may be provided for each aperture lens so that different selections of film strips may be employed at the same time.

In the present example the centers of the film frames on adjacent strips are quite closely spaced and the group of frames are arranged with respect to the center of the screen with the center line of the screen lying between the overlay blue light and the overlay white light. The film strip may be held against the aperture lenses or in the film plane by any suitable means. Such means may include the use of a glass pressure pad or the impingement of a stream of air against the film in order to hold it in the plane against the aperture lens. In the event such a stream of air is employed for this purpose, it will be apparent that the stream of air will also serve to cool and reduce any remaining heat imparted to the film strip by the light source.

Each of the projection lenses 12–16 inclusive may be provided with a suitable light intensity control means for the purpose of varying or modifying the brightness of the image projected from each projection lens. Such intensity control is desirable during projection of the different colored lights in order to provide a desired contrast of the projected images upon the screen.

Operation of the above-described wide angle projection system in an exemplary situation such as mentioned earlier may include the mounting of a screen of selected size and the installation of a projector 10 at a projector station P behind a screen S in order to project upon the back of the screen the several images M, W, B, G and R. The map image M may be projected with maximum brilliance in order to bring out numerous features on the map which is projected from the map film strip (may be 70 mm. film). Preferably such a map is projected in color. The film strips employed with the white, blue, green and read overlay images may comprise an opaque mask having a transparent image made thereon which is projected in a selected color upon the map and as an overlay on the screen. Thus by making selected symbols on such a mask in proper orientation with the map the symbols may be projected in color on the map on the screen and by changing such film strips where necessary the overlay images may be located in different positions according to time.

The optical system described above provides an extremely wide angle projection system which employs only one light source in effective manner and which projects with the one light source a plurality of images which may be provided on one film strip or on a plurality of separate film strips. Such multiple projection of as many as three or more images from one light source and with the avoidance of vignetting and the reduction of parallax to a minimum is provided by the relay and reimaging lens system in each light path. Moreover the relay and reimaging lens system provides means for obtaining a compact wide angle projection system without the use of large cumbersome equipment and separate condenser lenses for each projection lens.

It will be understood that while light from the single light source may be divided, split, and directed as above described, other combinations or variations may be used. For example, each light path may transmit only white light; wave-length bands of light, other than red, green, and blue, may be transmitted. Different amounts of light may be directed along the several separate paths.

It is also important to note that virtually all of the light of the single light source is effectively used; that is, light emanating from the source through 360° in azimuth is directed or redirected into a selected light path. Three main light paths may be used, each receiving light from a 120° arc and three condenser lenses may surround the source. In such instance, reflector means at the light source may not be required. When reflector means are used at the light source, the optical system is so arranged that spherical type reflectors may be used and may accept light through approximately 90° in the polar dimension of the light source.

It is also apparent that wide angle illumination of a screen may be obtained from a single light source by the relay lens system of this invention and wherein two light paths, each having a relay lens, may be used, the aperture lenses being so arranged that through one projector light from one path illuminates one half the screen and light from the other path illuminates the other half of the screen. Suitable means may be used to adjust and bring together the two light beams into abutting relation so that a joint line or overlapping of illuminated parts of the screen will be unnoticed. Such separate illumination of portions of a screen by a single and common light source from which light is transmitted in separate paths to a single projector may have various utility, such as for comparative purposes.

It will be understood that various modifications and changes may be made in the system described above and all such changes coming within the scope of the appended claims are embraced thereby.

I claim:

1. A geometrically compact wide angle projection system for simultaneously projecting a plurality of images with a single light source upon a large closely spaced screen, the combination of: a single light source; a plurality of aperture lenses spaced from said light source; means defining a film plane common to each of said aperture lenses, means operatively associated with said single light source for directing virtually all of the light from said source into two main light beams with separate respective light paths, said directing means including two condenser lenses and a part spherical reflector means at the light source; a plurality of dichroic means positioned in the path of one main light beam for dividing said light beam into separate selected wave-length bands of light; a relay lens operatively disposed between each of said light dividing means and each respective aperture lens; means separating the other main light beam into two light beam portions each portion containing all wavelength bands of light; relay lens means between said light separating means and its respective aperture lenses in the path of each light beam portion; reflector means providing folded light paths for said separated wave-length bands of light and said light beam portions; and projection lens means for said aperture lenses whereby intelligence on a plurality of film frames may be projected simultaneously on said screen in predetermined oriented relation.

2. A geometrically compact wide angle projection system for simultaneously projecting a plurality of images with a single light source upon a large closely spaced screen, the combination of: a single light source; a plurality of aperture lenses spaced from the light source and arranged in a row in close spaced relation; means defining a film plane common to said aperture lenses; means at said light source for directing light from said source into two main light beams; a condenser lens in the path of each main light beam and adjcent said light source; dichroic means spaced from the condenser lens positioned in the light path of one main light beam for dividing said light beam into separate selected wave-length bands of light and directed along separate paths; means positioned in the light path of the other main light beam for separating the same into two light beam portions containing all wave-length bands of light; relay lens means between both light dividing means and light separating means and aperture lenses associated therewith; reflector means providing folded light paths for said separate wave-length bands of light and said light beam portions; and projection lens means for said aperture lenses.

3. A projection means for wide angle projection of a plurality of images from a common film plane with a single light source and with a wide angle projection throw, the combination of: a projection frame means; a single light source carried by the frame means; a plurality of condenser lenses operatively associated with said light source for directing light emitted therefrom along two main light beams, a spherical reflector means at said light source and operatively associated with said condenser lenses to direct all light to said condenser lenses; a relay lens positioned in the light path of each of said two main light beams at an aerial image of said light source formed by said condenser lenses; an aperture lens in the path of light transmitted through each relay lens said aperture lenses being in closely spaced relation, said relay lens imaging the associated condenser lens at the film plane; said relay lens in each light path being located between said condenser lenses and said aperture lenses in such position and relation that all light in each of said light paths illuminates the respective areas in the film plane to be illuminated with virtually all of the light collected by the condenser lenses; reflector means in each light path for folding said light path between the condenser lens and the aperture lens; and a projector lens cooperably associated with each aperture lens and having a nodal point coincident with the focal plane of said aperture lens whereby said light source is imaged at said projection lens, said projector lenses being in closely spaced relation.

4. A projection device as stated in claim 3 including means for separating one main light beam into a plurality of light beam portions contaning all wave length bands of light in the visible spectrum, one of said light beam portions being adapted to project intelligence over the entire screen area and the other light beam portion being adapted to simultaneously project different intelligence over the screen area.

5. A compact wide angle projection system for presentation of a plurality of separately projected images to a group of persons and upon a relatively large screen with a projection distance substantially less than the longest dimension of the projected image, the combination of: a single light source; condenser means for directing all light from said light source into a plurality of light paths, at least one of said light paths including a light beam containing all wave-length bands of light of the visible spectrum, means in at least one other light path to receive all wave-length bands of light from the condenser means and for separating a selected wave-length band of light from such light; a relay lens in each of said light paths at an image of said light source formed by said directing means; an aperture lens in each light path in close spaced relation to the other aperture lenses; a film plane receiving the image of said condenser means in each light path; the relay lens in each light path being located between said condenser means and said aperture lens in such position that all light in each of said light paths illuminates the area of the film plane to be illuminated with virtually all of the light collected by said condenser means; reflector means in each of said light paths for folding said light paths between said condenser means and said aperture lens; a projection lens in each light path coaxial with each aperture lens and receiving the image of said light source through said aperture lens in magnified relation and whereby intersection of light rays in adjacent light paths in back of said film plane is obviated for prevention of vignetting when said aperture lenses and projection lenses are spaced in close parallel relation.

6. A wide angle projection system as stated in claim 2 including a spherical reflector means for said single light source.

7. A geometrically compact, wide angle projection system for simultaneously projecting a plurality of images with a single light source upon a large, closely spaced screen, the combination of: a single light source; a plurality of aperture lenses spaced from the light source and arranged in a row in close spaced relation; means defining a film plane common to said aperture lenses; a film strip in said film plane; means at said light source for directing light from said source into two main light beams; a condenser lens in the path of each main light beam; dichroic means spaced from the condenser lens positioned in the light path of one main light beam for dividing said light beam into separate selected wave length bands of light and directing each wave-length band of light along separate paths; means positioned in the light path of the other main light beam for separating the same into two light beam portions contining all wave-length bands of light; relay lens means between both light dividing means and light separating means and aperture lenses associated therewith; reflector means providing folded light paths for said separate wave-length bands of light and said light beam portions; and projection lens means for said aperture lenses; one of said light beam portions illuminating the entire area of said screen through one of said projection lens means, the other of said light beam portions projecting on the entire screen area a selected image provided on said film strip, said separate wave-length bands of light directed along separate paths projecting on said screen area intelligence in color in a form provided on said film strip.

8. A geometrically compact wide angle projection system for simultaneously projecting a plurality of images with a single light source upon a large closely spaced screen, the combination of: a single light source; a plurality of aperture lenses spaced from said light source; means defining a film plane common to each of said aperture lenses; means operatively associated with said single light source for directing virtually all of the light from said source into at least two main light beams with separate respective light paths, said directing means including a condenser lens for each main light beam and a part spherical reflector means at the light source; dichroic means positioned in the path of a first one of said main light beams for dividing the beam into more than one selected wave-length band of light; a relay lens operatively disposed between said light dividing means and respective aperture lens in the light path of each selected wave-length band of light; another relay lens operatively disposed between the said condenser lens and aperture lens in the other light beam, all of said relay lenses being positioned in their respective light paths in such relation with respect to and between said condenser and aperture lenses that virtually all of the light collected by the condenser lenses illuminates the respective areas of the film plane to be projected; reflector means providing folded light paths for said separated wave-length bands of light and said light beam; and projection lens means for said aperture lenses whereby intelligence on a plurality of film frames may be projected simultaneously on said screen in predetermined oriented relation under uniform illumination.

9. A projection system as stated in claim 8 including light dividing means in the path of the said other main light beam for dividing the said other main light beam into more than one light beam portion, each containing all wave-length bands of light.

10. A projection system as stated in claim 8 including light dividing means in the path of said other main light beam for dividing said other light beam into more than one wave-length band of light.

References Cited by the Examiner

UNITED STATES PATENTS

| | | | |
|---|---|---|---|
| 432,530 | 7/1890 | Ives. | |
| 973,961 | 10/1910 | Oliver | 352—42 |
| 1,428,103 | 9/1922 | Kohler | 88—24 |
| 1,857,135 | 5/1932 | Brenkert et al. | 88—24 |
| 1,857,441 | 5/1932 | De Francisco | 88—1 X |
| 1,861,496 | 6/1932 | Guggenheim | 352—67 |
| 1,870,664 | 8/1932 | Wright. | |
| 1,897,098 | 2/1933 | Wright | 88—24 |
| 2,604,813 | 7/1952 | Gretener | 88—1 X |
| 2,858,731 | 11/1958 | Rehorn | 88—1 X |
| 2,971,051 | 2/1961 | Back | 88—1 X |
| 2,973,683 | 3/1961 | Rowe et al. | 88—1 |
| 3,006,989 | 10/1961 | Schroter | 178—5.4 |
| 3,017,454 | 1/1962 | James et al. | 88—1 X |
| 3,043,190 | 7/1962 | Mandler | 88—24 |

NORTON ANSHER, *Primary Examiner.*

EMIL G. ANDERSON, WILLIAM MISIEK, *Examiners.*